(12) United States Patent
Addington et al.

(10) Patent No.: US 7,568,209 B1
(45) Date of Patent: Jul. 28, 2009

(54) METHOD AND SYSTEM FOR THE MANAGEMENT OF TARGETED MATERIAL INSERTION USING A CAMPAIGN MANAGER

(75) Inventors: Timothy H. Addington, Roswell, GA (US); Mark Robertson, Lawrenceville, GA (US)

(73) Assignee: Tanderberg Television, Inc., Duluth, GA (US)

( * ) Notice: Subject to any disclaimer, the term of this patent is extended or adjusted under 35 U.S.C. 154(b) by 839 days.

(21) Appl. No.: 10/976,286

(22) Filed: Oct. 28, 2004

Related U.S. Application Data

(60) Provisional application No. 60/520,082, filed on Nov. 14, 2003, provisional application No. 60/566,651, filed on Apr. 30, 2004.

(51) Int. Cl.
*H04N 7/10* (2006.01)
*H04N 7/025* (2006.01)
*H04N 60/33* (2006.01)
*G06K 9/00* (2006.01)
*G06K 9/36* (2006.01)

(52) U.S. Cl. ............... 725/32; 725/9; 382/181; 382/276

(58) Field of Classification Search ............ None
See application file for complete search history.

(56) References Cited

U.S. PATENT DOCUMENTS

| | | | |
|---|---|---|---|
| 5,264,933 A * | 11/1993 | Rosser et al. | 348/578 |
| 5,404,516 A | 4/1995 | Georgiades et al. | |
| 5,412,720 A | 5/1995 | Hoarty | |
| 5,485,219 A | 1/1996 | Woo | |
| 5,543,856 A * | 8/1996 | Rosser et al. | 348/578 |
| 5,600,573 A * | 2/1997 | Hendricks et al. | 725/109 |
| 5,790,173 A | 8/1998 | Strauss et al. | |
| 5,815,662 A | 9/1998 | Ong | |
| 5,861,906 A | 1/1999 | Dunn et al. | |
| 5,920,700 A | 7/1999 | Gordon et al. | |
| 5,923,362 A | 7/1999 | Klosterman | |
| 5,956,716 A * | 9/1999 | Kenner et al. | 707/10 |
| 6,005,603 A | 12/1999 | Flavin | |
| 6,119,154 A | 9/2000 | Weaver et al. | |

(Continued)

FOREIGN PATENT DOCUMENTS

EP  0727908  8/1996

(Continued)

OTHER PUBLICATIONS

Shah et al.; *Logical Information Modeling of Web-accessible Heterogeneous Digital Assets*; Research and Technology Advances in Digital Libraries; 1998; ADL 98; Proceeding International Forum on Apr. 22-24, 1998; pp. 266-275.

(Continued)

*Primary Examiner*—Dominic D Saltarelli
(74) *Attorney, Agent, or Firm*—King & Spalding LLP

(57) ABSTRACT

A media manager can insert targeted material into content in accordance with a campaign. A campaign can identify the location in the content where the targeted material should be inserted. A campaign manager can create the campaign and can determine based upon configuration information relating to the media manager, whether the targeted material can be inserted into the content upon the media manager receiving a request for the content.

66 Claims, 9 Drawing Sheets

U.S. PATENT DOCUMENTS

| | | |
|---|---|---|
| 6,181,336 B1 | 1/2001 | Chiu et al. |
| 6,201,536 B1 | 3/2001 | Hendricks et al. |
| 6,389,538 B1 | 5/2002 | Gruse et al. ................. 713/194 |
| 6,536,868 B1 | 3/2003 | Kawamura et al. ............ 347/40 |
| 6,574,655 B1 | 6/2003 | Libert et al. ................ 709/200 |
| 6,587,837 B1 | 7/2003 | Spagna et al. ................. 705/26 |
| 6,698,020 B1* | 2/2004 | Zigmond et al. .............. 725/34 |
| 6,760,721 B1 | 7/2004 | Chasen et al. .................. 707/3 |
| 6,912,567 B1 | 6/2005 | Allard et al. |
| 6,959,288 B1 | 10/2005 | Medina et al. |
| 2001/0013127 A1 | 8/2001 | Tomita et al. |
| 2002/0010936 A1 | 1/2002 | Adam |
| 2002/0092022 A1 | 7/2002 | Dudkicwicz et al. |
| 2002/0095526 A1* | 7/2002 | Herzi ......................... 709/327 |
| 2002/0178211 A1 | 11/2002 | Singhal et al. |

FOREIGN PATENT DOCUMENTS

| | | |
|---|---|---|
| EP | 1146731 | 10/2001 |
| WO | WO 01/60767 | 8/2001 |
| WO | WO 02/45423 | 6/2002 |

OTHER PUBLICATIONS

PCT International Search Report, PCT/US04/41784, Feb. 8, 2006.
TVN's MSO Client List Grows; Matt Stump, Multichannel News, Mar. 18, 2002.
TVN Delivers Charter, Comcast, Matt Stump, Multichannel News, Jul. 15, 2002.
From MajorNewswire.com; Arts & Entertainment; Major Cable Nets Choose TVN for VOD Services; Dec. 2, 2002.
TVN's Secure Satellite Transport System Endorsed by Movie Studios and Event Distributors; Burbank, Calif., Nov. 28, 2000.
Hwang, "Protocol for Collaborative Multimedia Presentations", Multimedia and Expo, 2000. ICME 2000. 2000 IEEE International Conference, New York, New York, USA, Jul. 30, 2000.

* cited by examiner

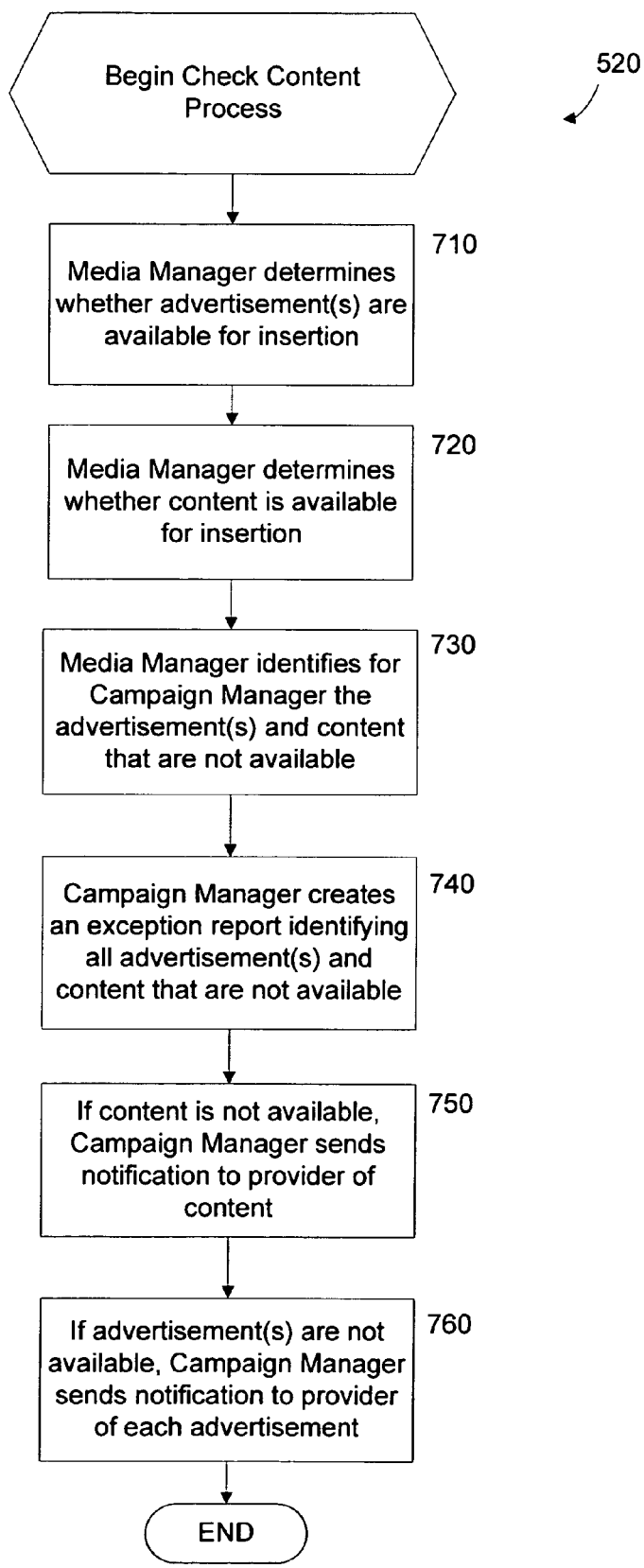

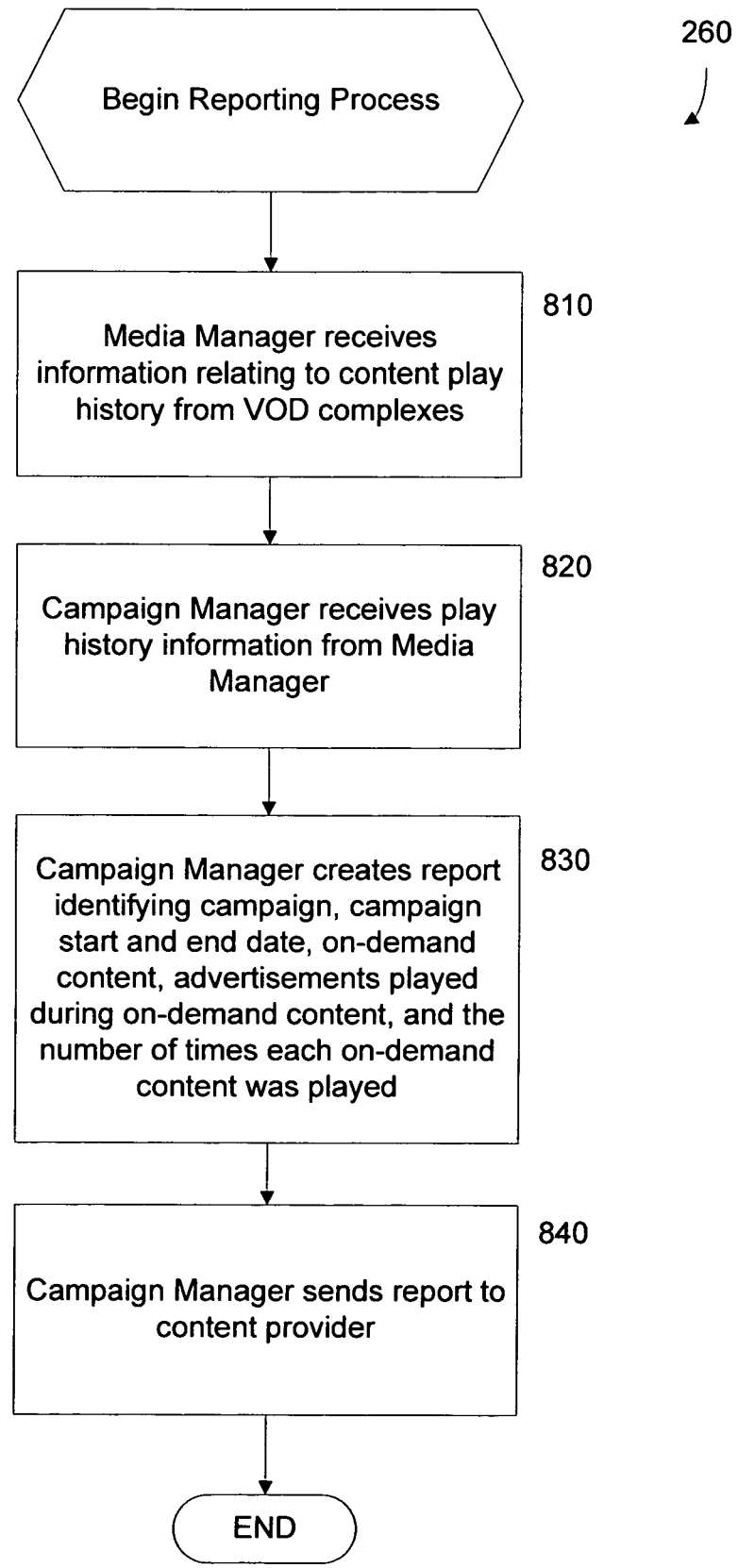

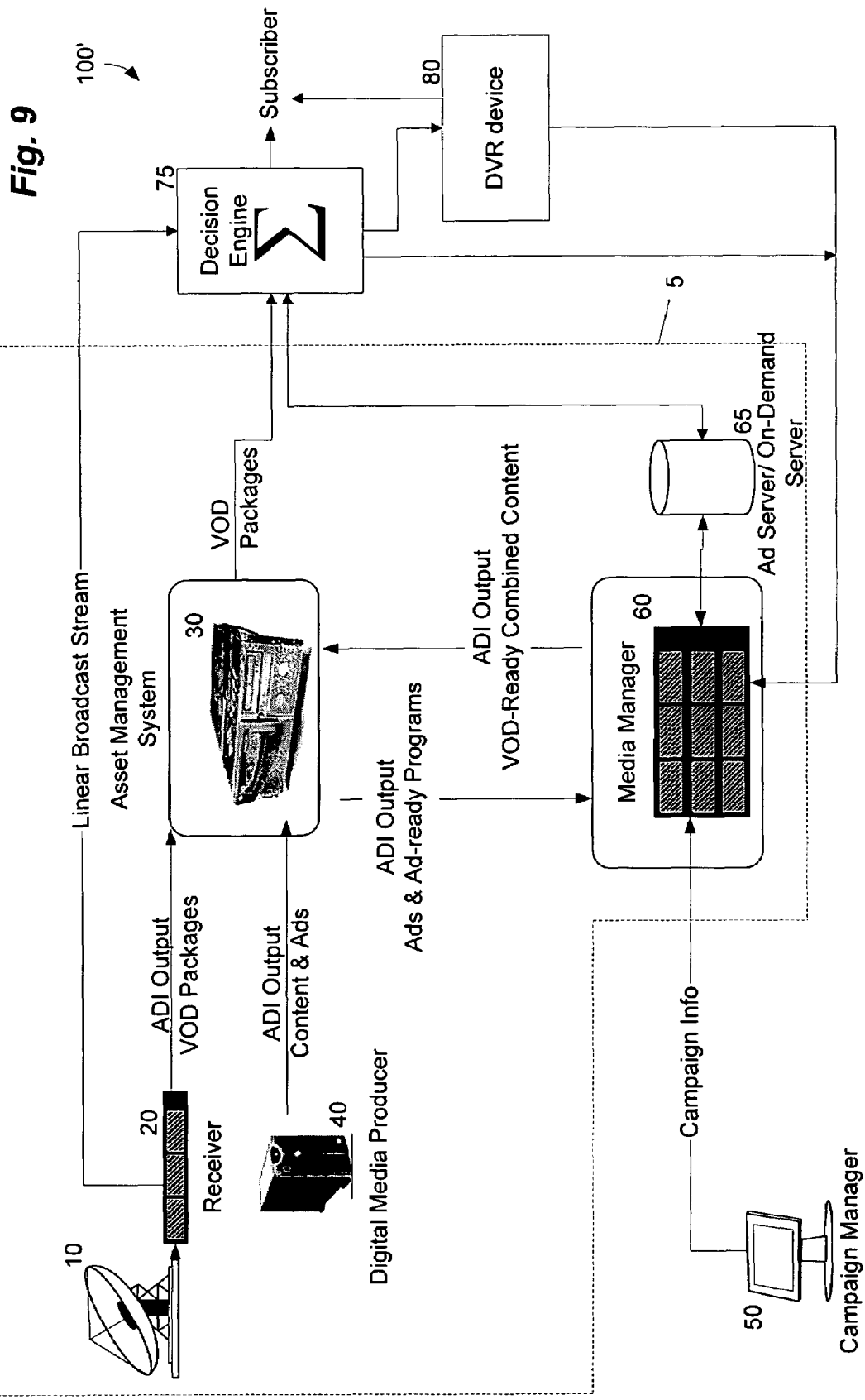

METHOD AND SYSTEM FOR THE MANAGEMENT OF TARGETED MATERIAL INSERTION USING A CAMPAIGN MANAGER

PRIORITY CLAIM TO PROVISIONAL APPLICATIONS

This application claims benefit of priority to U.S. Provisional Application Ser. No. 60/520,082 entitled "Systems and Methods for Insertion of Advertising Information Into a Digital Video Stream," filed Nov. 14, 2003. The subject matter of U.S. Provisional Application Ser. No. 60/520,082 is hereby fully incorporated herein by reference. This application also claims benefit of priority to U.S. Provisional Application Ser. No. 60/566,651 entitled "System and Method for Advertising Campaign Management Associated With On-Demand Programming in Digital Cable TV Networks," filed Apr. 30, 2004. The subject matter of U.S. Provisional Application Ser. No. 60/566,651 is hereby fully incorporated herein by reference.

FIELD OF THE INVENTION

The present invention is generally directed to cable television networks. More particularly described, the present invention supports the creation and management of campaigns independent of the underlying system or technology, where the campaigns define where targeted material, such as advertisements, should be inserted in programming content.

BACKGROUND OF THE INVENTION

In the conventional art, cable providers, such as Comcast Corporation and Adelphia Communications, and content providers, such as Home Box Office, NBC, Home & Garden Television ("HGTV"), and Warner Bros., can target cable subscribers with certain types of advertising content based upon the cable subscribers' demographic. For example, by creating an advertising "campaign," a cable provider can specify which zip codes should view a commercial relating to a local business. Similarly, a cable provider can create a campaign that defines at what times during the evening a movie trailer targeting adult viewers should be played.

One limitation of conventional cable systems, however, is that a cable provider typically has multi-vendor on-demand systems and, if a campaign is to be used for each on-demand system, the cable provider must create a separate campaign for each vendor's system. In other words, the cable provider cannot create a single campaign that can be used across multi-vendor systems employed throughout its network.

Another limitation of conventional cable systems is that a content provider cannot create a single campaign for use by multiple cable providers. Since each cable provider typically uses on-demand systems provided by a variety of vendors, the content provider must know which vendors' on-demand systems are used by a particular cable provider and must create a separate campaign for each vendor's on-demand system.

As a result, neither the content providers nor the cable providers have a single unified view of what campaigns have been implemented across the multiple cable providers or across the multi-vendor on-demand systems. Thus, a sales department within a content provider or cable provider that is responsible for selling advertising time cannot easily view the inventory of available advertising time across multi-vendor systems or across cable providers. In addition, the content providers and cable providers cannot easily determine whether advertising content or on-demand content specified in a campaign is available within the network for distribution to cable subscribers.

Consequently, there is a need in the art for a system and method that allows for the creation and management of campaigns independent of the underlying on-demand system or technology. Additionally, there is a need in the art for a system and method that provides a unified view of what campaigns have been implemented across a network of multiple cable providers or across multi-vendor on-demand systems. Finally, there is a need in the art for a system and method that notifies a content provider or a cable provider when targeted material, such as advertising, or on-demand content specified in a campaign is not available for insertion and distribution to cable subscribers.

SUMMARY OF THE INVENTION

The present invention can solve the aforementioned problems by providing a system and method for managing targeted material insertion. In one aspect of the invention, a media manager can insert targeted material into content in accordance with a campaign. A campaign can identify the location in the content where the targeted material should be inserted in the content and configuration information relating to the media manager. A campaign manager can create the campaign and can determine based upon configuration information relating to the media manager, whether the targeted material can be inserted into the content upon the media manager receiving a request for the content.

Various aspects of the present invention may be more clearly understood and appreciated from a review of the following detailed description of the disclosed embodiments and by reference to the drawings and claims.

BRIEF DESCRIPTION OF DRAWINGS

FIG. 7 is a logic flow diagram illustrating an exemplary process for determining whether advertisements and content are available for insertion in accordance with an embodiment of the present invention.

FIG. 8 is a logic flow diagram illustrating an exemplary process for reporting play history information for advertisements in accordance with an embodiment of the present invention.

FIG. 9 is a block diagram illustrating another exemplary system for creating and managing campaigns using a campaign manager in accordance with an embodiment of the present invention.

DETAILED DESCRIPTION OF EXEMPLARY EMBODIMENTS

Figure 1:
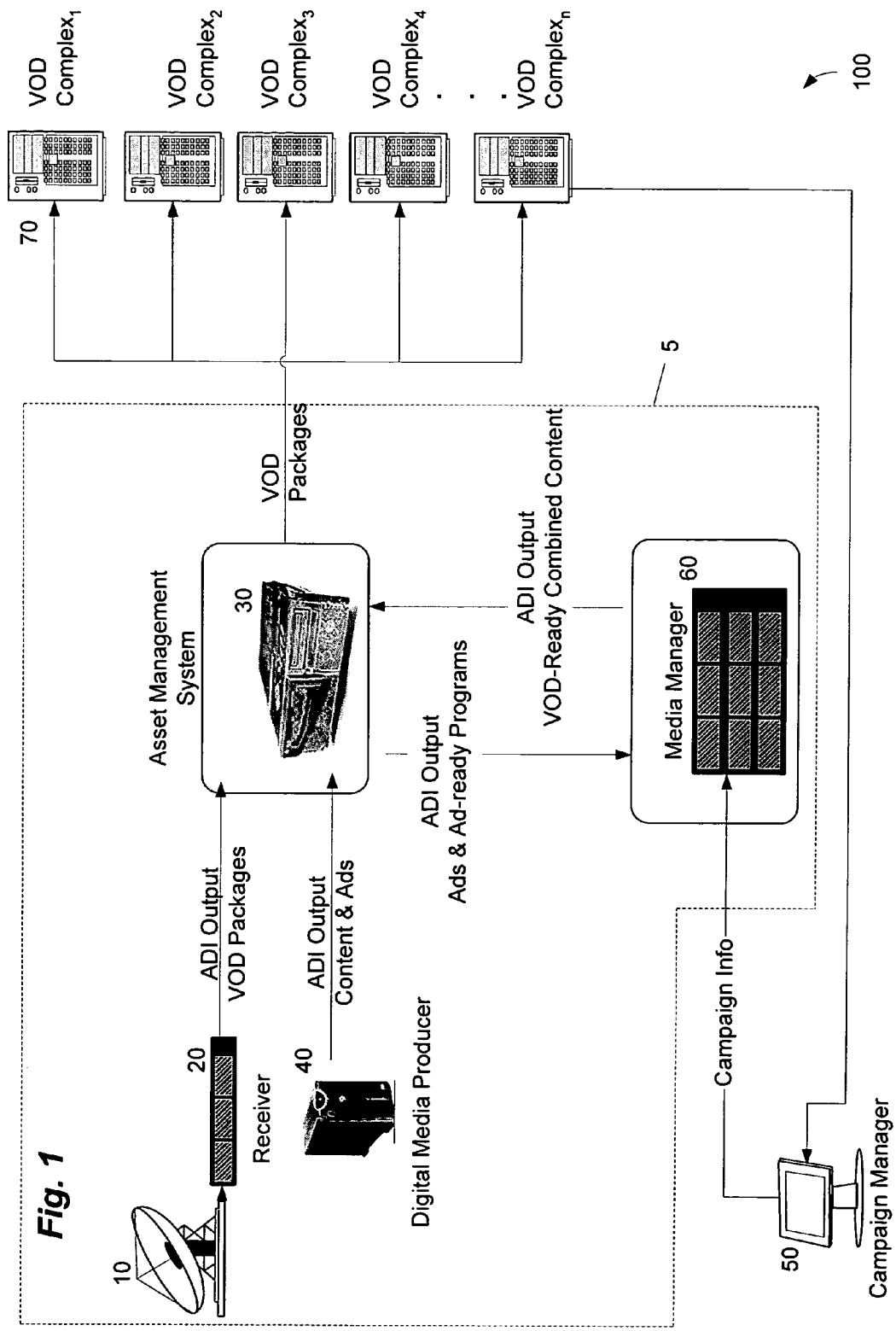
FIG. 1 is a block diagram illustrating an exemplary system for creating and managing campaigns using a campaign manager in accordance with an embodiment of the present invention.

In one exemplary embodiment of the present invention, a receiver located at a cable headend can receive content, such as on-demand content, and targeted material to be inserted in the content, such as advertisements, from a content provider. The receiver can receive the content and the targeted material via a communications medium, such as via satellite or over an IP network.

The content can be capable of supporting digital program insertion. Metadata associated with the content can identify the number and type of available insertion points in the content. The metadata can be distributed to the headend with the content or separately through an out-of-band mechanism.

Using an exemplary digital media producer, a content provider or a cable provider can create and produce linear broadcast content and digital content for targeted material insertion and can package the targeted material for insertion into content. In addition, an operator can use the digital media producer to create metadata that describes the targeted material and package the targeted material into an industry standard package for insertion and use.

An exemplary asset management system can manage and store content and targeted material received from content providers, the digital media producer, or other sources of content. The asset management system can also send targeted material, like advertisements, and avail-enabled content to the media manager for processing. An exemplary media manager can insert the targeted material into the content in accordance with campaigns.

A content provider or cable provider can create campaigns using an exemplary campaign manager. A campaign can define the targeted material that should be inserted into content and where the targeted material should be placed within the content.

Once a campaign is created, the media manager can insert the targeted material into the content for play out to a subscriber. In addition, a media manager can create placement instructions so that another device can insert the targeted material into the content at a later time. The media manager also can track inventory for the targeted material and content and send alert notifications and exception reports to the campaign manager when targeted material and content are not stored in the asset management system (or other storage device) a configurable number of days prior to the date on which the targeted material is to be inserted in the content.

Although the illustrative embodiments will be generally described in the context of on-demand cable television systems, those skilled in the art will recognize that other exemplary embodiments of the present invention may comprise the insertion of targeted material into linear program content and program content targeted for digital video recorder ("DVR") devices. Those skilled in the art will further recognize that other exemplary embodiments of the present invention may be implemented for any application in which targeted material is to be inserted into content in accordance with a campaign. By way of example, other exemplary environments and applications include, without limitation, digital radio, the World Wide Web, streaming audio, wireless video devices, and telco environments.

In addition, although the illustrative embodiments will be generally described in the context of advertisement insertion, those skilled in the art will recognize that any type of targeted material can be inserted into content, including, without limitation, advertisements, special promotions, infomercials, entertainment content, educational content, and movie trailers.

Those skilled in the art will also recognize that the digital insertion of targeted material can occur at different points along the distribution of the content. For example, the insertion of the targeted material can occur at a cable headend by a media manager, at the on-demand server by the on-demand server prior to the content being viewed by a subscriber, and at a DVR device by the DVR device prior to the content being viewed by the subscriber. In this way, the system allows for the placement and/or replacement of inserted targeted material at various points along the distribution path. Accordingly, a national or default advertisement can be inserted into content before the content provider sends the content to a headend, the headend can insert a local advertisement in place of the national or default advertisement, and an on-demand server or DVR device can insert a personalized advertisement or a more recent advertisement prior to the content being viewed by a particular subscriber. Any of these entities could also delete the advertisement, if desired.

Both the program content, whether linear or digital, and the targeted material must be prepared in advance to support digital program insertion. In one exemplary embodiment, content can be embedded with DVS 253 triggers to identify the available insertion points. The metadata associated with the content can identify the number and type of available insertion points. The DVS triggers can be inserted in the content by the content provider or by the cable provider.

Referring now to the drawings in which like numerals represent like elements throughout the several figures, exemplary embodiments of the present invention and the illustrative operating environment will be described.

FIG. 1 is a block diagram illustrating an exemplary system 100 for creating and managing a campaign using a campaign manager 50 in accordance with an embodiment of the present invention. Although individual components are illustrated in the exemplary system 100 of FIG. 1, multiple components can be employed without departing from the scope and spirit of the present invention.

The exemplary system 100 comprises one or more receivers 20 coupled to a communications medium, such as a satellite network 10 or IP network, and an asset management system 30. Content, including on-demand content, linear broadcast content, and advertisements, can be received from one or more content providers at the receiver 20 via the communications medium. The content must support digital program insertion. In one exemplary embodiment, the content can comprise DVS 253 triggers that identify the available insertion points.

Metadata associated with the content can identify the number and type of available insertion points. The metadata for digital content can be distributed to the asset management system 30 with the content or separately through an out-of-band mechanism. Metadata for linear content, if available, can be distributed to the asset management system 30 separately through an out-of-band mechanism. On-demand content and advertisements can be formatted in industry standard digital formats, such as the MPEG-2 format.

The system 100 further comprises a digital media producer 40. The digital media producer 40 can be located anywhere in the system 100, including at the content provider or at a cable provider's headend 5.

Using the digital media producer 40, a content provider or a cable provider can create and produce on-demand content for advertisement insertion and can package advertisements for insertion into on-demand content. For example, an operator can mark avail positions in the metadata of the on-demand content using the digital media producer 40. An avail is a trigger or marker in the on-demand content that identifies where advertisements may be inserted.

In addition, an operator can use the digital media producer 40 to create metadata that describes the advertisement and to package the advertisement into an industry standard ADI package for on-demand insertion and use. Once on-demand content and advertisements are formatted and packaged using the digital media producer 40, the digital media producer 40 sends the on-demand content and advertisements, which are each uniquely identified by an identifier, to the asset management system 30 for management and storage.

The asset management system 30 manages and stores on-demand content and advertisements received from any source, including content providers, the digital media producer 40, other asset management systems, and content distribution systems (systems that are responsible for distributing content to one or more headends). The asset management system 30 also sends advertising content and avail-enabled on-demand content to the media manager 60 for processing. Specifically, the asset management system 30 sends the advertising content and the on-demand content to the media manager 60 so that the media manager 60 can insert the advertisements into the on-demand content in accordance with campaigns. The asset management system 30 also delivers content to servers, such as video on-demand servers 70 and ad servers, and DVR devices, via the communications network.

The system 100 further comprises a campaign manager 50. One or more campaign managers 50 can be located throughout the system 100, including at the content provider or at the cable provider's headend 5. A content provider or cable provider can create advertising campaigns using the campaign manager 50. A campaign is a file that contains a set of rules that the campaign manager 50 uses to define which advertisements should be inserted into on-demand content and where the advertisements should be placed within the content. In one exemplary embodiment of the present invention, a campaign can be defined as an XML document.

The campaign manager 50 collects, stores, manages, and reconciles for reporting all the information about advertisements, programming avails, targeted insertion sites, and campaigns. The campaign manager 50 allows users to schedule advertisements, match advertisements with on-demand content, and create rules for advertising campaign insertions. The campaign manager 50 also reconciles on-demand usage information and campaign information to generate reports.

Once a campaign is created using the campaign manager 50, the campaign information is sent to the media manager 60 over the communications network. In one exemplary embodiment of the present invention, the media manager 60, based on the rules defined in the campaigns, combines advertisements and on-demand content into a single asset for play out by the on-demand servers 70. In another exemplary embodiment, the media manager 60, based on the rules defined in the campaigns, creates placement instructions directed to an on-demand server 70 or other device so that the advertisements can be inserted into the on-demand content at a later time by the device.

The media manager 60 also tracks inventory for advertisements and avail-marked on-demand content and sends alerts and exception reports to the campaign manager 50 when assets are missing.

Certain steps in the processes described below in connection with FIGS. 2 through 8 must naturally precede others for the present invention to function as described. However, the present invention is not limited to the order of the steps described, if such order or sequence does not alter the functionality of the present invention. It is recognized that some steps may be performed before or after other steps without departing from the scope and spirit of the present invention.

Figure 2:
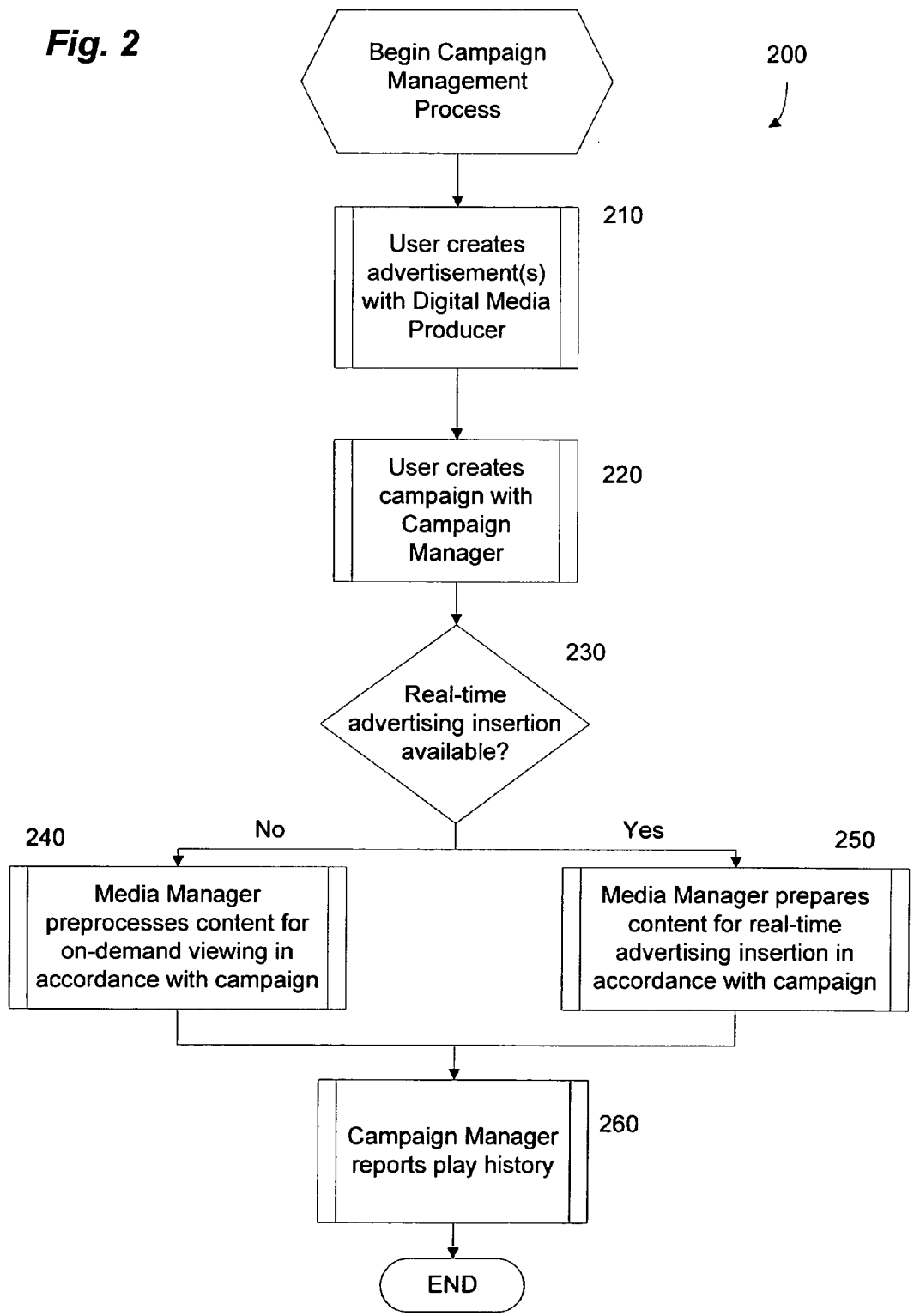
FIG. 2 is a logic flow diagram illustrating an exemplary process for managing campaigns in accordance with an embodiment of the present invention.

FIG. 2 is a logic flow diagram illustrating an exemplary process 200 for managing campaigns in accordance with an embodiment of the present invention. Step 210 is the first step in the exemplary process 200. In Step 210, a user creates one or more advertisements with the digital media producer 40. In one exemplary embodiment of the present invention, the digital media producer 40 packages advertisements for use in an on-demand system using an industry-standard specification, such as the Cable Labs® Asset Distribution Interface ("ADI") Specification. As is understood by those skilled in the art, ADI is a specification for packaging and distributing digital content and related metadata.

In Step 220, the user creates a campaign with the campaign manager 50. In creating a campaign, the user identifies the advertisements to be used in the campaign, the on-demand content in which the advertisements are to be inserted, and the positions in the on-demand content where the advertisements are to be inserted.

In Step 230, the system 100 determines whether real-time advertising insertion is available. Specifically, the system 100 determines whether the on-demand system is capable of inserting advertisements in real-time, i.e., as the on-demand content is being played out for viewing by a subscriber, or whether the advertisements must be inserted into the on-demand content before it is available for viewing by a subscriber.

In Step 240, if real-time advertising insertion is not available, the media manager 60 preprocesses the content for on-demand viewing. Specifically, the media manager 60 combines the advertisements and the on-demand content into a single asset in accordance with a campaign. However, if real-time advertising insertion is available, then in Step 250, the media manager 60 prepares the content for real-time advertising insertion. In Step 260, the campaign manager 50 reports the play history of the advertisements based on play information it receives from the media manager 60.

Figure 3:
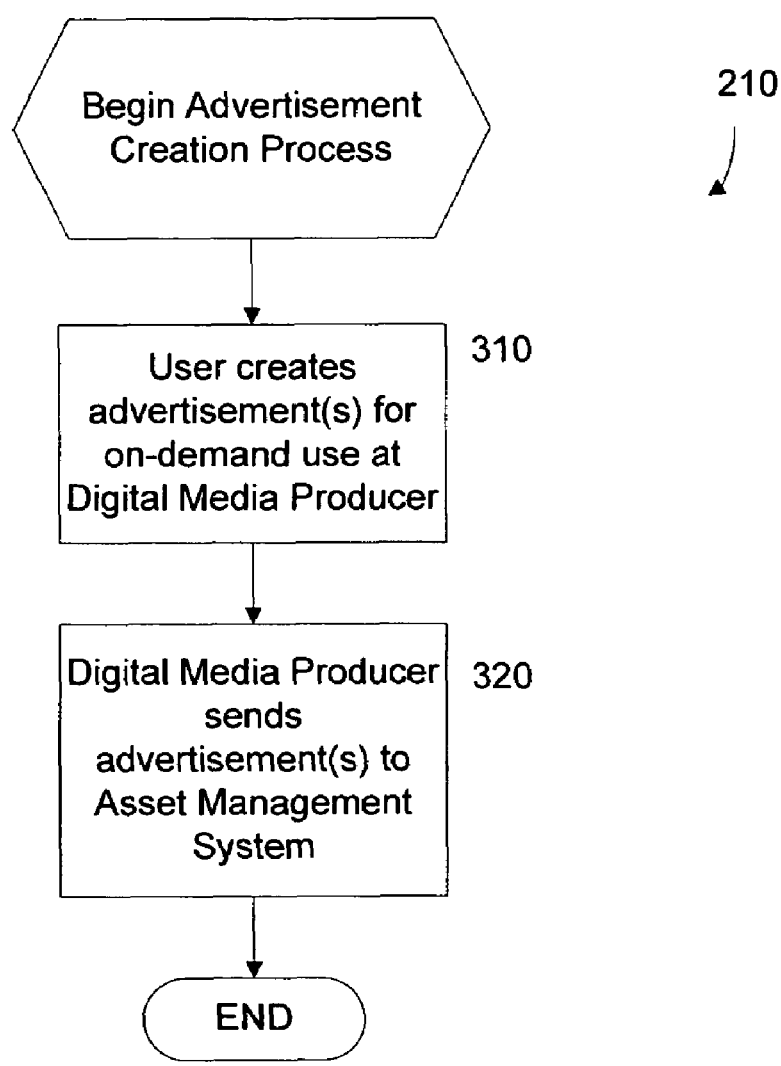
FIG. 3 is a logic flow diagram illustrating an exemplary process for creating advertisements in accordance with an embodiment of the present invention.

FIG. 3 is a logic flow diagram illustrating an exemplary process 210 for creating advertisements in accordance with an embodiment of the present invention. Step 310 is the first step in the exemplary process 210. In Step 310, a user creates advertisements for on-demand use using the digital media producer 40. In one exemplary embodiment of the present invention, the digital media producer 40 packages advertisements for use in an on-demand system using the industry-standard ADI Specification. In Step 320, the digital media producer 40 sends the packaged advertisements to the asset management system 30 for storage and maintenance.

Figure 4:
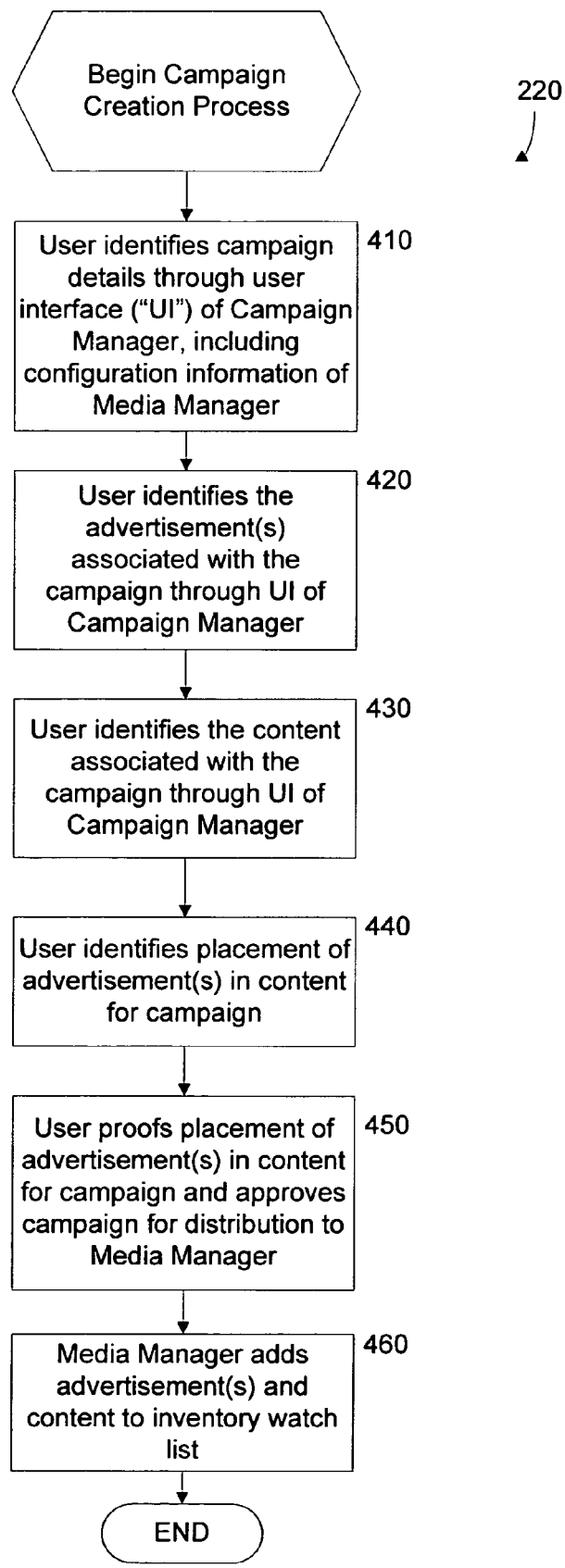
FIG. 4 is a logic flow diagram illustrating an exemplary process for creating a campaign in accordance with an embodiment of the present invention.

FIG. 4 is a logic flow diagram illustrating an exemplary process 220 for creating a campaign in accordance with an embodiment of the present invention. Step 410 is the first step in the exemplary process 220. In Step 410, a user identifies campaign details through the user interface ("UI") of the campaign manager 50. For example, the user can identify the name of the campaign, the name and account information relating to the company associated with the campaign (such as a content provider, a cable provider, or an advertising agency), the campaign start date, the campaign end date, and the names and contact information for the individuals who should be notified when the on-demand content or the advertisements used in the campaign are missing in the system 100.

The user can also identify the media manager 30 locations that will implement the campaign. The campaign manager 50 uses the configuration information for each media manager 60 in order to determine whether the media manager 60 can support real-time advertisement insertion, or whether the media manager 60 must preprocess the on-demand content by inserting the advertisements in the on-demand content before the content is delivered to the video on-demand servers by the asset management system 30.

In one exemplary embodiment of the present invention, the user specifies the information relating to each media manager 40, including the IP address of the media manager 40 and the functional capabilities of the media manager 40, upon the installation and configuration of the campaign manager 50. In another exemplary embodiment, the campaign manager 50 can discover information about each media manager 60 by polling the media manager 60 for configuration information. For example, the user can provide to the campaign manager 50 for authentication purposes the media manager's 60 IP address and a unique identifier to be assigned to the media manager 60. The campaign manager 50 initially assigns a default configuration to the media manager 60. During the installation of the media manager 60, the user provides the unique identifier, the authentication credentials, and the configuration information for the media manager 60. Upon installation of the media manager 60, the media manager 60 authenticates itself with the campaign manager 50 using the unique identifier and the authentication credentials and reports its configuration to the campaign manager 50. Once the media manager 60 reports its configuration to the campaign manager 50, the campaign manager 50 stores the actual configuration of the media manager 60 and deletes the default configuration stored in the campaign manager 50.

In Step 420, the user identifies the advertisements to be associated with a campaign through the UI of the campaign manager 50. In one exemplary embodiment, a user can select one or more advertisements from a list of advertisements available during the campaign start and end dates, which are to be used in the campaign. The UI can display information relating to each advertisement, including the name of the advertisement, the name of the company that provided the advertisement, a flight start and end date (i.e., the license window dates for the advertisement), the run time (i.e., the length of the advertisement), and a unique advertisement identification code.

In Step 430, the user identifies the on-demand content associated with the campaign through the UI of the campaign manager 50. In one exemplary embodiment, a user can select the on-demand content from a list of the on-demand content available during the campaign start and end dates, which are to be associated with the campaign. The UI can display information relating to the on-demand content, including the name of each asset, the name of the company that provided the asset, a license start and end date for the asset, the run time (i.e., the length of the asset), each avail position associated with the asset, and one or more indicators that identify whether the avail position is already occupied by another advertisement. In other words, the UI of the campaign manager 50 can identify whether an avail position is available or occupied by another advertisement, and for each occupied avail position, it can identify information relating to the advertisement that occupies the avail, such as the name of the advertisement and the name of the company that provided the advertisement.

In Step 440, the user identifies the placement of the advertisements in the on-demand content for the campaign. In one exemplary embodiment, using the UI of the campaign manager 50, the user selects an unoccupied avail position within the on-demand asset and identifies which advertisement is to be placed in the avail position. To assist the user in this selection process, the UI identifies, for each avail, the minimum length and maximum length of an advertisement that can be placed in the avail, and the positions within the avail that are occupied or available.

In Step 450, the user proofs the placement of the advertisements within the on-demand content specified for the campaign and approves the campaign for distribution to the media manager 60. In Step 460, the media manager 60 adds the advertisements and the on-demand content identified in the campaign to an inventory watch list. The media manager 60 uses the inventory watch list to determine whether advertisements and on-demand content identified in the campaigns are available on the system 100 before they are needed by the system 100 for insertion and distribution to subscribers.

Figure 5:
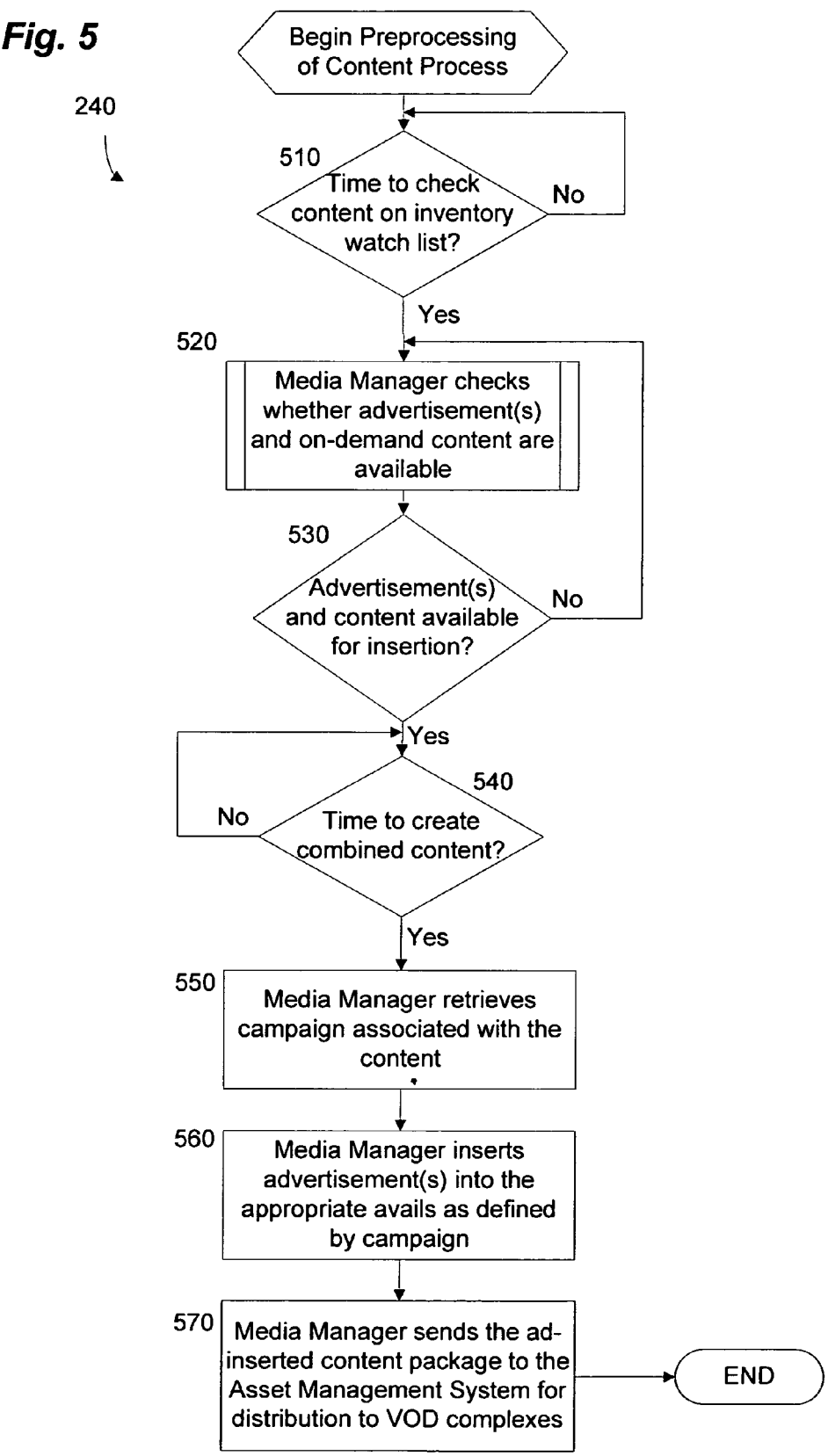
FIG. 5 is a logic flow diagram illustrating an exemplary process for preprocessing advertisements and on-demand content in accordance with an embodiment of the present invention.

FIG. 5 is a logic flow diagram illustrating an exemplary process 240 for pre-processing advertisements and on-demand content in accordance with an embodiment of the present invention. Step 510 is the first step in the exemplary process 240. In Step 240, the system 100 determines whether it is time to check the on-demand content and advertisements identified on the inventory watch list. A user can configure how soon prior to the start date of a campaign the system 100 should determine whether the on-demand content and the advertisements identified in the campaign are available for insertion in the system 100.

In Step 510, if it is time to check the content identified in the inventory watch list, then in Step 520, the media manager 60 checks whether the advertisements and on-demand content identified in the campaign are stored in the asset management system 30. In Step 530, if the advertisements and on-demand content are stored in the asset management system 30 and are available for insertion, then in Step 540, the system 100 determines whether it is time to insert the advertisements into the on-demand content. A user can configure how soon prior to the start date of the campaign the system 100 should insert the advertisements into the on-demand content.

If, in Step 540, it is time to insert the advertisements into the on-demand content, then in Step 550, the media manager 60 retrieves the campaign associated with the on-demand content. In Step 560, the media manager 60 inserts the advertisements into the appropriate avails as defined by the campaign. In Step 570, the media manager 60 sends the advertisement-inserted content package to the asset management system 30 for distribution to one or more on-demand servers 70.

Figure 6:
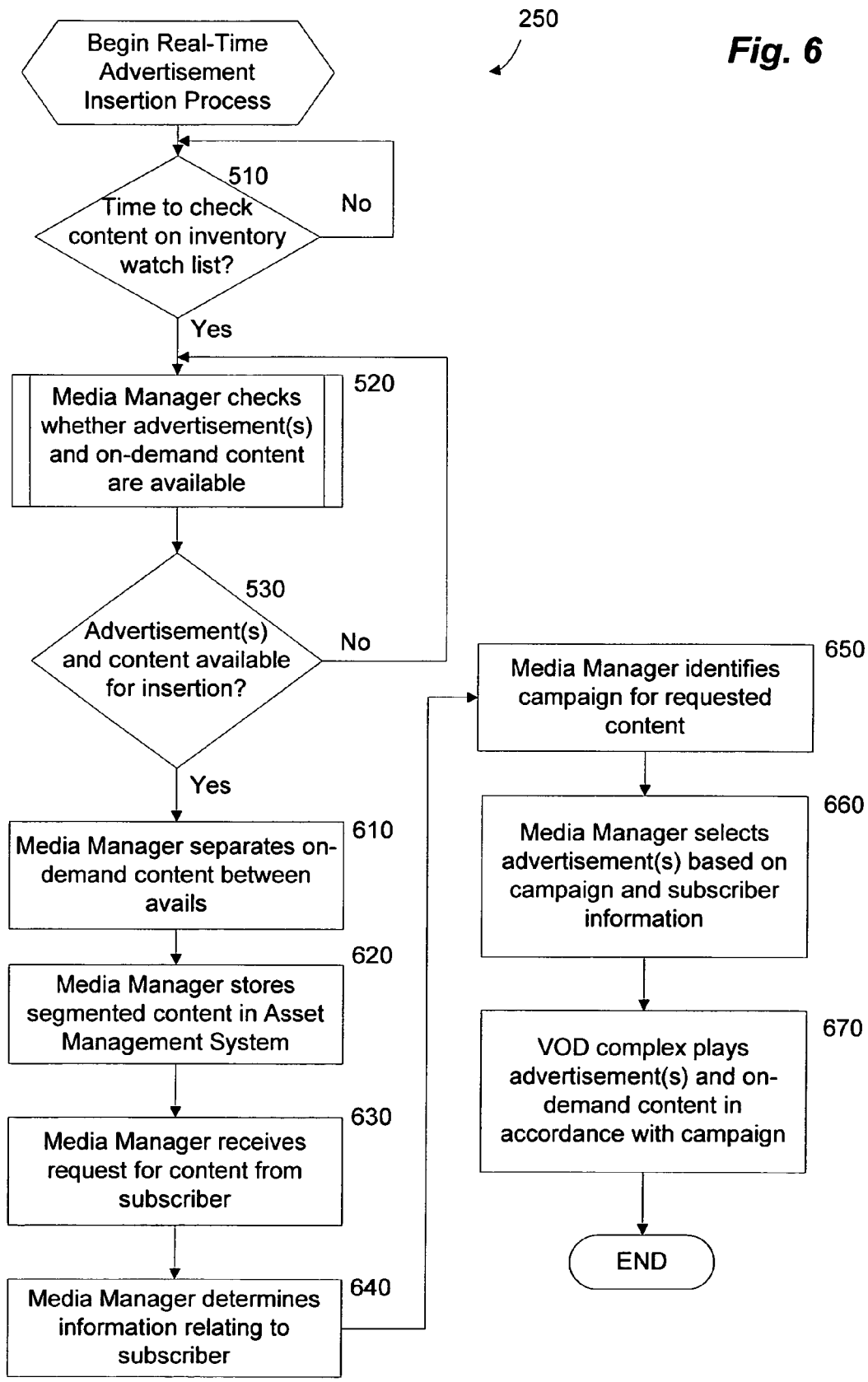
FIG. 6 is a logic flow diagram illustrating an exemplary process for inserting advertisements into on-demand content in real-time in accordance with an embodiment of the present invention.

FIG. 6 is a logic flow diagram illustrating an exemplary process 250 for inserting advertisements into on-demand content in real-time. Step 510 is the first step in the exemplary process 250 in accordance with an embodiment of the present invention. In Step 510, the system 100 determines whether it is time to check the content identified on the inventory watch list. A user can configure how soon prior to the start date of a campaign the system 100 should determine whether on-demand content and advertisements identified in the campaign are available for insertion in the system 100. If, in Step 510, it is time to check the content on the inventory watch list, then in Step 520, the media manager 60 checks whether the advertisements and on-demand content identified in a campaign are available in the asset management system 30.

In Step 530, if the advertisements and content are available for insertion, then in Step 610, the media manager 60 separates the on-demand content between the avails. In other words, the media manager 60 cuts the on-demand content at the frames specified by the avail markers. In Step 620, the media manager 60 stores the segmented on-demand content in the asset management system 30.

In Step 630, the media manager 60 receives a request for the on-demand content from a cable subscriber. In Step 640, the media manager 60 determines demographic information relating to the cable subscriber. In Step 650, the media manager 60 identifies the appropriate campaign for the requested content. In Step 660, the media manager 60 selects which advertisements to insert into the avails of the on-demand content based on the campaign and the subscriber demographic information. In Step 670, the on-demand server 70 inserts the advertisements into the requested on-demand content in accordance with the campaign.

In another embodiment of the present invention, the asset management system 30 sends the segmented on-demand content, the advertisements identified in the campaign, and the campaign to the on-demand servers 70. Upon receiving a request for the on-demand content, the on-demand server 70 determines which advertisements should be spliced into the on-demand stream in accordance with the campaign. The on-demand server then streams the advertisements in accordance with the campaign when it detects an avail. If the advertisements are stored on another server, such as an ad server, the on-demand server can instruct the ad server to stream the advertisements in accordance with the campaign, and then return to streaming the on-demand content. If the advertisement is missing, the on-demand server can continue streaming the on-demand content or insert a default advertisement in place of the scheduled advertisement.

FIG. 7 is a logic flow diagram illustrating an exemplary process 520 for determining whether advertisements and on-demand content are available for insertion in accordance with an embodiment of the present invention. Step 710 is the first step in the exemplary process 520. In Step 710, the media manager 60 determines whether the advertisements identified in the campaign are available for insertion. In one exemplary embodiment, the media manager 60 determines whether the advertisements are stored in the asset management system 30 and are available for insertion.

In Step 720, the media manager 60 determines whether the on-demand content identified in the campaign is available for insertion. In one exemplary embodiment, the media manager 60 determines whether the on-demand content is stored in the asset management system 30.

In Step 730, the media manager 60 identifies for the campaign manager 50 the advertisements and on-demand content identified in the campaign that are not available for insertion. In Step 740, the campaign manager 50 creates an exception report identifying the advertisements and the on-demand content that are not available in the system 100. In Step 750, for each on-demand asset not available, the campaign manager 50 sends a notification to the provider of the on-demand content that the content is not available for insertion. In Step 760, for each advertisement not available, the campaign manager 50 sends a notification to the provider of the advertisement that the advertisement is not available for insertion.

FIG. 8 is a logic flow diagram illustrating an exemplary process 260 for recording play history information for an advertisement. Step 810 is the first step in the exemplary process 260 in accordance with an embodiment of the present invention. In Step 810, the media manager 60 receives information relating to content play history from the on-demand servers 70. The media manager 60 can accept data in XML format or in any digital format from an on-demand data repository.

In Step 820, the campaign manager 50 receives the play history information from the media manager 60. In Step 830, the campaign manager 50 creates a report identifying the campaign, the campaign start and end date, the on-demand content identified in the campaign, the advertisements played during the on-demand content, the number of times each on-demand asset was played, and therefore, the number of times each advertisement was played. In Step 840, the campaign manager 50 sends the report to the provider of the advertisement.

FIG. 9 is a block diagram illustrating another exemplary system 100' for creating and managing campaigns using a campaign manager 50 in accordance with an embodiment of the present invention. Although individual components are illustrated in the exemplary system 100' of FIG. 9, multiple components can be employed without departing from the scope and spirit of the present invention.

In one exemplary embodiment of the present invention, advertisements can be inserted into a linear broadcast stream as it is played out in real-time to the cable subscriber. When an avail is detected in the broadcast stream, a decision engine 75 notifies the media manager 60 that the advertisements to be inserted in the linear broadcast stream are required. The media manager 60 determines which advertisements are to be inserted into the linear broadcast stream based upon the campaigns that have been configured for the system 100'. Upon receiving instructions from the media manager 60, an ad server or on-demand server 65, which stores the advertisements, plays out the advertisements in the appropriate avail positions in accordance with the campaign. Upon the conclusion of the ad server/on-demand server 65 playing out the advertisements specified for the avail, the decision engine 75 continues to play out the linear broadcast stream to the subscriber until the next avail.

In another exemplary embodiment of the present invention, advertisements can be inserted into a content stream as it is played out to the subscriber from a DVR device 80. The DVR device 80 stores the digital content, the advertisements, and the campaigns associated with the content and advertisements (or placement instructions relating to the campaigns). When the DVR device 80 detects an avail, the DVR device 80 plays out the advertisements in the appropriate avail positions in accordance with the campaign. Upon the conclusion of the DVR device 80 playing out the advertisements specified for the avail, the DVR device 80 continues to play out the digital content to the subscriber until the next avail.

Those skilled in the art will appreciate that the exemplary system 100, 100' allows for the creation and management of campaigns independent of the underlying system or technology through the use of a campaign manager 50 that knows the configuration of the media managers 60 employed throughout the system 100, 100' and that can decide how to process content based upon the configuration of the media managers 60.

Additionally, those skilled in the art will appreciate that the exemplary system 100, 100' provides a unified view of what campaigns have been implemented across a network of multiple cable providers or across multi-vendor systems through its implementation of a single campaign manager 50 that monitors a network of multiple cable providers or multiple multi-vendor systems. Finally, those skilled in the art will appreciate that the exemplary system 100, 100' can notify a content provider or a cable provider when advertising content or content specified in a campaign is not available for insertion and distribution to cable subscribers by monitoring and maintaining an inventory watch list and by issuing notifications when advertisements and content are missing.

It should be understood that the foregoing relates only to illustrative embodiments of the present invention, and that numerous changes may be made therein without departing from the scope and spirit of the invention as defined by the following claims.

We claim:

1. A method for managing the distribution of targeted material, comprising the steps of:
   creating a campaign comprising a location in content where the targeted material is to be inserted in the content and configuration information relating to the insertion,
   wherein the configuration information indicates whether the targeted material can be inserted into the content in real time after receiving a request for the content;
   determining, based upon the configuration information, whether the targeted material can be inserted in the content in real time upon receiving a request for the content;
   in response to determining that the targeted material can be inserted in real time, inserting the targeted material in the location in the content in accordance with the campaign; and
   in response to determining that the targeted material cannot be inserted into the content in real time, preprocessing the content by inserting the targeted material into the content and storing the targeted material-inserted content in advance of a request for the content.

2. The method of claim 1, wherein the creating step comprises the steps of:
   identifying the content in which the targeted material is to be inserted;
   identifying the targeted material to be inserted in the content; and
   identifying the location in the content in which the targeted material is to be inserted.

3. The method of claim 1, further comprising the step of delivering the targeted material-inserted content to a subscriber.

4. The method of claim 1, wherein the content comprises avails identifying the location in the content where the targeted material can be inserted, and wherein the method further comprises the steps of:
   if the targeted material can be inserted in the content in real time upon receiving the request for the content, segmenting the content between the avails;
   in response to receiving the request, identifying the targeted material to be inserted in the content based on the campaign associated with the content; and
   delivering to the subscriber the targeted material and the segmented content in accordance with the campaign.

5. The method of claim 4, wherein the step of identifying the targeted material to be inserted in the content comprises identifying the targeted material to be inserted in the content based on demographic information relating to the subscriber issuing the request.

6. The method of claim 1, comprising the steps of:
   determining whether the targeted material and the content are available for insertion by polling a storage device to determine if the targeted material and the content are stored in the storage device; and
   sending a notification if one of the targeted material and the content is not stored in the storage device.

7. The method of claim 6, wherein the sending step comprises sending the notification to a provider of the content, if the content is not stored in the storage device.

8. The method of claim 6, wherein the sending step comprises sending the notification to a provider of the targeted material, if the targeted material is not stored in the storage device.

9. The method of claim 6, further comprising the steps of:
   creating the targeted material for insertion into the content; and
   storing the targeted material in the storage device.

10. The method of claim 6, further comprising the steps of:
    receiving the content from the provider of the content; and
    storing the content in the storage device.

11. The method of claim 6, further comprising the step of creating a report identifying at least one of the targeted material and the content that is not stored in the storage device.

12. The method of claim 1, further comprising the steps of:
    receiving information identifying the play history of the content;
    associating the play history of the content with the targeted material inserted in the content; and
    generating a report indicating the play history for the content and the targeted material inserted in the content.

13. A system for managing targeted material insertion, comprising:
    a media manager, operative to insert targeted material in a location in the content in accordance with a campaign comprising the location in the content where the targeted material is to be inserted in the content and configuration information relating to the media manager,
    wherein the configuration information comprises an indication of whether the media manager is capable of inserting targeted material into content in real time in response to a request for the content; and
    a campaign manager, coupled to the media manager, operative to create the campaign and to determine, based upon the configuration information, whether the targeted material can be inserted by the media manager in real time into the content upon the media manager receiving a request for the content, and to preprocess the content by inserting the targeted material into the content and storing the targeted material-inserted content in advance of a request for the content in response to determining that the targeted material cannot be inserted in real time into the content.

14. The system of claim 13, wherein the campaign manager is operative to identify the content in which the targeted material is to be inserted, to identify the targeted material to be inserted in the content, and to identify the location in the content in which the targeted material is to be inserted.

15. The system of claim 13, wherein the media manager is operative to deliver the targeted material-inserted content to a subscriber in response to the request for the content.

16. The system of claim 15, wherein the media manager is operative to separate the content from the location in the content where the targeted material is to be inserted, to identify the targeted material to be inserted in the content based on the campaign associated with the content, if the targeted material can be inserted into the content upon receiving the request, and to deliver to the subscriber the targeted material and the separated content in accordance with the campaign, in response to receiving the request for the content.

17. The system of claim 16, wherein the media manager is operative to identify the targeted material to be inserted in the content based on demographic information relating to the subscriber issuing the request.

18. The system of claim 13, further comprising:
a storage device, operative to store at least one of the targeted material and the content;
wherein the media manager is operative to determine whether the targeted material and the content are available for insertion by polling the storage device to determine if the targeted material and the content are stored in the storage device; and
wherein the campaign manager is operative to send a notification if one of the targeted material and the content is not stored in the storage device.

19. The system of claim 18, wherein the campaign manager is operative to send the notification to a provider of the content, if the content is not stored in the storage device.

20. The system of claim 18, wherein the campaign manager is operative to send the notification to a provider of the targeted material, if the targeted material is not stored in the storage device.

21. The system of claim 18, further comprising a media producer, operative to create the targeted material for insertion into the content and store the targeted material in the storage device.

22. The system of claim 13, wherein the campaign manager is operative to receive information identifying the play history of the content, to associate the play history of the content with the targeted material inserted in the content, and to report the play history for the content and the targeted material inserted in the content.

23. A method for managing a campaign, comprising the steps of:
receiving the campaign identifying content in which targeted material is to be inserted, the targeted material to be inserted in the content, a location in the content in which the targeted material is to be inserted, and configuration information relating to the insertion,
wherein the configuration information comprises an indication whether targeted material can be inserted into content in real time in response to a request for the content;
determining, based on the configuration information, whether the targeted material can be inserted in the content in real time upon receiving a request for the content;
in response to determining that the targeted material cannot be inserted in real time in the content upon receiving the request;
inserting the targeted material in the location in the content in accordance with the campaign;
storing the targeted material-inserted content, and
delivering the stored targeted material-inserted content to a subscriber upon request;
in response to determining that the targeted material can be inserted into the content upon receiving the requests;
separating the content from the location in the content in which the targeted material is to be inserted,
upon receiving the request, identifying the targeted material to be inserted in the content based on the campaign associated with the content, and
delivering the targeted material and the separated content in accordance with the campaign.

24. The method of claim 23, comprising the step of creating the campaign, wherein the campaign identifies the content in which the targeted material is to be inserted, the targeted material to be inserted in the content, the location in the content in which the targeted material is to be inserted, and the configuration information relating to the insertion.

25. The method of claim 23, wherein the step of identifying the targeted material to be inserted in the content comprises identifying the targeted material to be inserted in the content based on demographic information relating to a subscriber issuing the request.

26. The method of claim 23, comprising the steps of:
determining whether the targeted material and the content are available for insertion by polling a storage device to determine if the targeted material and the content are stored in the storage device; and
sending a notification if one of the targeted material and the content is not stored in the storage device.

27. The method of claim 26, wherein the sending step comprises sending the notification to a provider of the content, if the content is not stored in the storage device.

28. The method of claim 26, wherein the sending step comprises sending the notification to a provider of the targeted material, if the targeted material is not stored in the storage device.

29. The method of claim 23, further comprising the steps of:
receiving information identifying the play history of the content;
associating the play history of the content with the targeted material inserted in the content; and
generating a report indicating the play history for the content and the targeted material inserted in the content.

30. A system for managing targeted material, comprising:
a media manager, operative to:
receive a campaign identifying content in which targeted material is to be inserted, the targeted material to be inserted in the content, and a location in the content in which the targeted material is to be inserted,
if the targeted material cannot be inserted into the content upon receiving a request for the content, to insert the targeted material in the location in the content in accordance with the campaign and to deliver the targeted material-inserted content to a subscriber, and
if the targeted material can be inserted into the content upon receiving the request, to separate the content from the location in the content in which the targeted material is to be inserted, to identify the targeted material to be inserted in the content based on the campaign associated with the content upon receiving the request, and to deliver the targeted material and the separated content in accordance with the campaign; and
a campaign manager, coupled to the media manager, operative to:
create the campaign in accordance with configuration information relating to the media manager performing the insertion, wherein the configuration information indicates whether the media manager can insert the targeted material into the content in real time upon receiving the request for the content, and
determine, based upon the configuration information relating to the media manager, whether the targeted material can be inserted in the content in real time upon receiving the request.

31. The system of claim 30, wherein the media manager is operative to identity the targeted material to be inserted in the content based on demographic information relating to the subscriber issuing the request.

32. The system of claim 30, comprising:
a storage device, operative to store the targeted material and the content;

wherein the media manager is operative to determine whether the targeted material and the content are available for insertion by polling the storage device to determine if the targeted material and the content are stored in the storage device; and wherein the campaign manager is operative to send a notification if the targeted material and the content is not stored in the storage device.

33. The system of claim 32, wherein the campaign manager is operative to send the notification to a provider of the content, if the content is not stored in the storage device.

34. The system of claim 32, wherein the campaign manager is operative to send the notification to a provider of the targeted material, if the targeted material is not stored in the storage device.

35. The system of claim 32, comprising a media producer, operative to create the targeted material for insertion into the content and to store the targeted material in the storage device.

36. The system of claim 32, comprising a receiver, operative to receive the content from the provider of the content and to store the content in the storage device.

37. The system of claim 32, wherein the campaign manager is operative to create a report identifying at least one of the targeted material and the content that is not stored in the storage device.

38. The system of claim 30, wherein the campaign manager is operative to receive information identifying the play history of the content, to associate the play history of the content with the targeted material inserted in the content, and to generate a report indicating the play history for the content and the targeted material inserted in the content.

39. A method for inserting targeted material in content, comprising the steps of:
responsive to a request for the content, determining whether targeted material can be inserted in the content in accordance with a campaign comprising (a) location information identifying a location for insertion of the targeted material in the content and (b) configuration information relating to the insertion, wherein the configuration information indicates whether the targeted material can be inserted into the content in real time upon receiving the request for the content;
in response to a determination that the targeted material can be inserted in the content in real time, inserting the targeted material in the location in the content; and
in response to a determination that the targeted material cannot be inserted in the content in real time, preprocessing the content by inserting the targeted material into the content and storing the targeted material-inserted content.

40. The method of claim 39, further comprising the step of creating the campaign.

41. The method of claim 40, wherein the step of creating the campaign comprises the steps of:
identifying the targeted material to be inserted in the content; and
identifying the location in the content in which the targeted material is to be inserted.

42. The method of claim 39, comprising the step of delivering the targeted material-inserted content to a subscriber issuing the request.

43. The method of claim 39, comprising the step of identifying the targeted material to be inserted in the content based on the campaign associated with the content, in response to the request for content.

44. The method of claim 43, wherein the step of identifying the targeted material to be inserted in the content comprises identifying the targeted material to be inserted in the content based on demographic information relating to the subscriber issuing the request.

45. The method of claim 39, comprising the steps of:
determining whether the targeted material and the content are available for insertion by polling a storage device to determine if the targeted material and the content are stored in the storage device; and
sending a notification if one of the targeted material and the content is not stored in the storage device.

46. The method of claim 45, wherein the sending step comprises sending the notification to a provider of the content, if the content is not stored in the storage device.

47. The method of claim 45, wherein the sending step comprises sending the notification to a provider of the targeted material, if the targeted material is not stored in the storage device.

48. The method of claim 39, comprising the steps of:
receiving information identifying the play history of the content;
associating the play history of the content with the targeted material inserted in the content; and
generating a report indicating the play history for the content and the targeted material inserted in the content.

49. A computer-readable medium encoded with computer-executable instructions for performing steps of a method for managing the distribution of targeted material, the steps comprising:
creating a campaign comprising a location in content where the targeted material is to be inserted in the content and configuration information relating to the insertion,
wherein the configuration information indicates whether the targeted material can be inserted into the content in real time after receiving a request for the content;
determining, based upon the configuration information, whether the targeted material can be inserted in the content in real time upon receiving a request for the content;
in response to determining that the targeted material can be inserted in real time, inserting the targeted material in the location in the content in accordance with the campaign; and
in response to determining that the targeted material cannot be inserted into the content in real time, preprocessing content by inserting the targeted material into the content and storing the targeted material-inserted content in advance of a request for the content.

50. The computer-readable medium of claim 49, wherein the creating step comprises the steps of:
identifying the content in which the targeted material is to be inserted;
identifying the targeted material to be inserted in the content; and
identifying the location in the content in which the targeted material is to be inserted.

51. The computer-readable medium of claim 49 encoded with further computer-executable instructions for performing the step of delivering the targeted material-inserted content to a subscriber.

52. The computer-readable medium of claim 49, wherein the content comprises avails identifying the location in the content where the targeted material can be inserted, and wherein the computer-readable medium is encoded with further computer-executable instructions for performing the steps of:

if the targeted material can be inserted in the content upon receiving the request for the content, segmenting the content between the avails;

in response to receiving the request, identifying the targeted material to be inserted in the content based on the campaign associated with the content; and delivering to the subscriber the targeted material and the segmented content in accordance with the campaign.

53. The computer-readable medium of claim 52, wherein the step of identifying the targeted material to be inserted in the content comprises identifying the targeted material to be inserted in the content based on demographic information relating to the subscriber issuing the request.

54. The computer-readable medium of claim 49 encoded with further computer-executable instructions for performing the steps of:

determining whether the targeted material and the content are available for insertion by polling a storage device to determine if the targeted material and the content are stored in the storage device; and sending a notification if one of the targeted material and the content is not stored in the storage device.

55. The computer-readable medium of claim 54, wherein the sending step comprises sending the notification to a provider of the content, if the content is not stored in the storage device.

56. The computer-readable medium of claim 54, wherein the sending step comprises sending the notification to a provider of the targeted material, if the targeted material is not stored in the storage device.

57. The computer-readable medium of claim 54 encoded with further computer-executable instructions for performing the steps of:

creating the targeted material for insertion into the content; and storing the targeted material in the storage device.

58. The computer-readable medium of claim 55 encoded with further computer-executable instructions for performing the steps of:

receiving the content from the provider of the content; and storing the content in the storage device.

59. The computer-readable medium of claim 54 encoded with further computer-executable instructions for performing the step of creating a report identifying at least one of the targeted material and the content that is not stored in the storage device.

60. The computer-readable medium of claim 49 encoded with further computer-executable instructions for performing the steps of:

receiving information identifying the play history of the content;

associating the play history of the content with the targeted material inserted in the content; and generating a report indicating the play history for the content and the targeted material inserted in the content.

61. The method of claim 1, wherein the request for the content is received from a subscriber.

62. The method of claim 61, wherein the requested content is on-demand content.

63. The system of claim 13, wherein the media manager is disposed at a cable headend.

64. The system of claim 63, wherein the media manager receives the request from a subscriber.

65. The system of claim 64, wherein the wherein the media manager inserts the targeted material in real time in response to the request from the subscriber.

66. The system of claim 13, wherein the requested content comprises on-demand content.

* * * * *